(12) United States Patent
Yamamoto

(10) Patent No.: US 8,577,408 B2
(45) Date of Patent: *Nov. 5, 2013

(54) RADIO COMMUNICATION APPARATUS AND TRANSMISSION POWER CONTROL METHOD

(75) Inventor: Takeshi Yamamoto, Tokyo (JP)

(73) Assignee: NEC Corporation, Tokyo (JP)

(*) Notice: Subject to any disclaimer, the term of this patent is extended or adjusted under 35 U.S.C. 154(b) by 128 days.

This patent is subject to a terminal disclaimer.

(21) Appl. No.: 13/048,371

(22) Filed: Mar. 15, 2011

(65) Prior Publication Data

US 2011/0165908 A1 Jul. 7, 2011

(30) Foreign Application Priority Data

Mar. 28, 2007 (JP) ................................ 2007-083633

(51) Int. Cl.
*H04B 7/00* (2006.01)
(52) U.S. Cl.
USPC ............... 455/522; 455/69; 455/70; 455/446; 455/447; 455/455; 370/315; 370/316; 370/317; 370/318; 370/319
(58) Field of Classification Search
USPC .............................. 455/446–455, 522, 69–70; 370/315–320
See application file for complete search history.

(56) References Cited

U.S. PATENT DOCUMENTS

| 8,208,951 | B2 * | 6/2012 | Yamamoto .................... | 455/522 |
| 2005/0119022 | A1 * | 6/2005 | Suzuka et al. ................ | 455/522 |
| 2008/0055068 | A1 * | 3/2008 | Van Wageningen et al. ......................... | 340/539.3 |

FOREIGN PATENT DOCUMENTS

| JP | 7/212303 A | 8/1995 |
| JP | 10-117166 A | 5/1998 |
| JP | 2006025028 A | 1/2006 |
| WO | 0203567 A2 | 1/2002 |
| WO | 2006008722 A1 | 1/2006 |

OTHER PUBLICATIONS

European Search Report for EP 08 00 5486 mailed Jul. 5, 2011.
H. Reumerman et al., "Distributed Power Control for Reliable Broadcast in Inter-Vehicle Communication Systems", 2nd International Workshop on Intelligent Transportation (WIT 2005), XP002643119, Mar. 16, 2005.
Japanese Office Action for JP2007-083633 issued Oct. 26, 2011.

* cited by examiner

*Primary Examiner* — Fayyaz Alam

(57) ABSTRACT

A radio communication apparatus which performs a direct communication with a counter radio communication apparatus is provided. The radio communication apparatus includes a radio section configured to receive from the counter radio communication apparatus, a first radio signal which contains a first transmission power setting value as a setting value of power at transmission from the counter radio communication apparatus, and to measure a first reception power value as a power value at reception of the first radio signal; and a transmission power control section configured to determine a second transmission power setting value as a setting value of power at transmission of a second radio signal to the counter radio communication apparatus based on the first transmission power setting value and the first reception power value. The radio section transmits the second radio signal, which contains the second transmission power setting value, to the counter radio communication apparatus at transmission power indicated with the second transmission power setting value.

6 Claims, 8 Drawing Sheets

Fig. 4

| ID DATA | TRANSMISSION POWER SETTING VALUE | RECEPTION POWER MEASUREMENT VALUE | RECEPTION TIME |
|---|---|---|---|
| | | | |

RADIO COMMUNICATION APPARATUS AND TRANSMISSION POWER CONTROL METHOD

REFERENCE TO RELATED APPLICATION

This is a continuation application of U.S. patent application Ser. No. 12/055,429 filed Mar. 26, 2008 and claims the benefit of its priority.

TECHNICAL FIELD

The present invention relates to a radio communication apparatus and a transmission power control method, and more particularly relates to a radio communication apparatus and a transmission power control method, in which a transmission power control is improved.

BACKGROUND ART

A radio communication system such as an inter-automobile communication system is known in which direct communication is carried out between automobile communication apparatuses without any intervention of a base station. In this radio communication system, the communication state changes with movement of the communication apparatus. For example, with the movement of the communication apparatuses, it would be assumed that a communication are has no communication counter end or few communication counter end, or on the contrary, the communication apparatuses are dense in a certain area, in which there are a large number of communicable counter ends.

In particular, when the communication apparatuses are dense, radio communication is congested, resulting in the generation of congestion and the drop of throughput. At this time, when the communication is carried out through a base station, the base station controls the transmission power. Thus, the communicable area can be adjusted, which can equivalently suppress the number of the communication apparatuses in the communication area. Therefore, it is possible to reserve radio links with peripheral communication apparatuses, and to relax the generation of the congestion and to eliminate the drop of throughput. However, in the radio communication system in which the direct communication is carried out between the automobile communication apparatuses without any intervention of the base station, such as the inter-automobile communication system, each automobile communication apparatus carries out the direct communication. Thus, it is difficult to properly set the transmission powers of those automobile communication devices. Each automobile communication apparatus is expected to autonomously set the proper transmission power on the basis of the distribution of the peripheral communication apparatuses.

Japanese Patent Application Publication (JP-P2003-143048A) discloses an inter-automobile communication apparatus and an inter-automobile communication method. The inter-automobile communication apparatus exchanges data through a radio communication between a plurality of automobiles. The inter-automobile communication apparatus retrieves peripheral automobiles that can relay a transmission data to a target automobile, in accordance with the communication state of the target automobile as a counter end to which the data is transmitted. Then, the inter-automobile communication apparatus has a section that wirelessly transmits the transmission data to the target automobile through a relaying automobile, if the relaying automobile that can carry out the relaying operation is retrieved. That is, this inter-automobile communication apparatus can carry out the transmission/reception without any increase in the transmission power, by changing the transmission path of the transmission data in accordance with a reception level of reception data.

Japanese Patent Application Publication (JP-P2003-258715A) describes a radio communication apparatus. This radio communication apparatus is installed in an automobile and used for the inter-automobile radio communication. This radio communication apparatus detects the number of automobiles in the vicinity of the automobile itself and randomly determines a transmission interval in accordance with the number of automobiles, and then transmits a frame including the vehicle information in the transmission interval. Also, there is a case that this radio communication apparatus randomly determines a transmission interval in accordance with the running speed corresponding to the running speed data of the automobile itself supplied from outside and transmits the frame including the vehicle information in the transmission interval.

SUMMARY

It is therefore an object of the present invention to provide a radio communication apparatus and a transmission power control method, in which a communicable area can be autonomously adjusted and equivalently adjust the number of communication apparatuses in a communication area, in a radio communication system such as the inter-automobile communication system in which a direct communication is carried out between automobile communication apparatuses without any intervention of a base station.

In a first exemplary embodiment of the present invention, a radio communication apparatus which performs a direct communication with a counter radio communication apparatus is provided. The radio communication apparatus includes a radio section configured to receive from the counter radio communication apparatus, a first radio signal which contains a first transmission power setting value as a setting value of power at transmission from the counter radio communication apparatus, and to measure a first reception power value as a power value at reception of the first radio signal; and a transmission power control section configured to determine a second transmission power setting value as a setting value of power at transmission of a second radio signal to the counter radio communication apparatus based on the first transmission power setting value and the first reception power value. The radio section transmits the second radio signal, which contains the second transmission power setting value, to the counter radio communication apparatus at transmission power indicated with the second transmission power setting value.

In a second exemplary embodiment of the present invention, a transmission power control method in a radio communication apparatus which performs a direct communication with a counter radio communication apparatus is provided. The transmission power control method includes measuring a first reception power value as a power value at reception of a first radio signal, when the first radio signal which contains a first transmission power setting value as a setting value of power at transmission from the counter radio communication apparatus is received from the counter radio communication apparatus; determining a second transmission power setting value as a setting value of power at transmission of a second radio signal to the counter radio communication apparatus based on the first transmission power setting value and the first reception power value; and transmitting the second radio signal, which contains the second transmission power setting value, to the counter radio communication apparatus in a transmission power indicated with the second transmission power setting value.

In a third exemplary embodiment of the present invention, a computer-readable software storage medium in which computer-readable codes of a program are written to realize a transmission power control method in a radio communication apparatus which performs a direct communication with a counter radio communication apparatus is provided. The transmission power control method includes measuring a first reception power value as a power value at reception of a first radio signal, when the first radio signal which contains a first transmission power setting value as a setting value of power at transmission from the counter radio communication apparatus is received from the counter radio communication apparatus; determining a second transmission power setting value as a setting value of power at transmission of a second radio signal to the counter radio communication apparatus based on the first transmission power setting value and the first reception power value; and transmitting the second radio signal, which contains the second transmission power setting value, to the counter radio communication apparatus in a transmission power indicated with the second transmission power setting value.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 4 is a table showing its peripheral automobile table;

EXEMPLARY EMBODIMENTS

Hereinafter, a radio communication apparatus according to exemplary embodiments of the present invention will be described in detail with reference to the attached drawings. Here, when a transmission power control method is applied to an inter-automobile communication system, the radio communication apparatus mounted on an automobile (a vehicle) will be described. In the inter-automobile communication system, radio communication is carried out between a plurality of on-board communication devices 1 (1-1, 1-2, . . . ). In this case, an on-board communication device transmits a data such as an automobile (vehicle) position data and a setting value of transmission power to peripheral automobiles. Also, the on-board communication device 1 holds the automobile position data and the transmission power setting values, which are received from the peripheral automobiles, and data of reception powers as the data of the peripheral automobiles. Also, the data are updated each time a signal is newly received from any of the peripheral automobile. In accordance with the data of the peripheral automobiles, transmission losses are estimated from the transmission power setting values of the peripheral automobiles and the actual reception powers. Moreover, the number of the receivable automobiles is estimated on the basis of the transmission power setting value at the time of the transmission from the automobile itself. Then, the transmission power is set such that a signal does not reaches many automobiles, more than necessary, and the signal is outputted. The exemplary embodiment of the present invention will be described below in detail.

Figure 1:
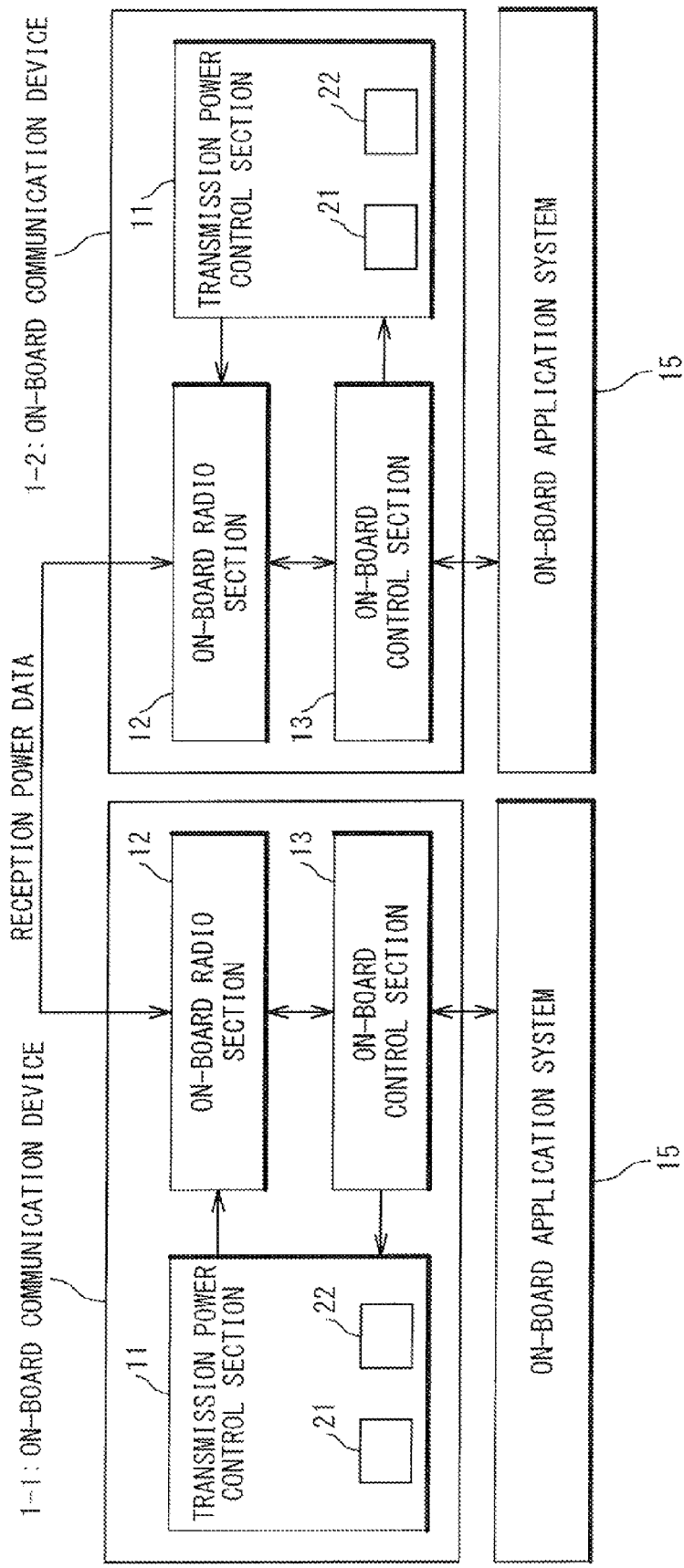
FIG. 1 is a block diagram showing a configuration of an exemplary embodiment of an on-board communication device as a radio communication apparatus of the present invention.
Figure 2:
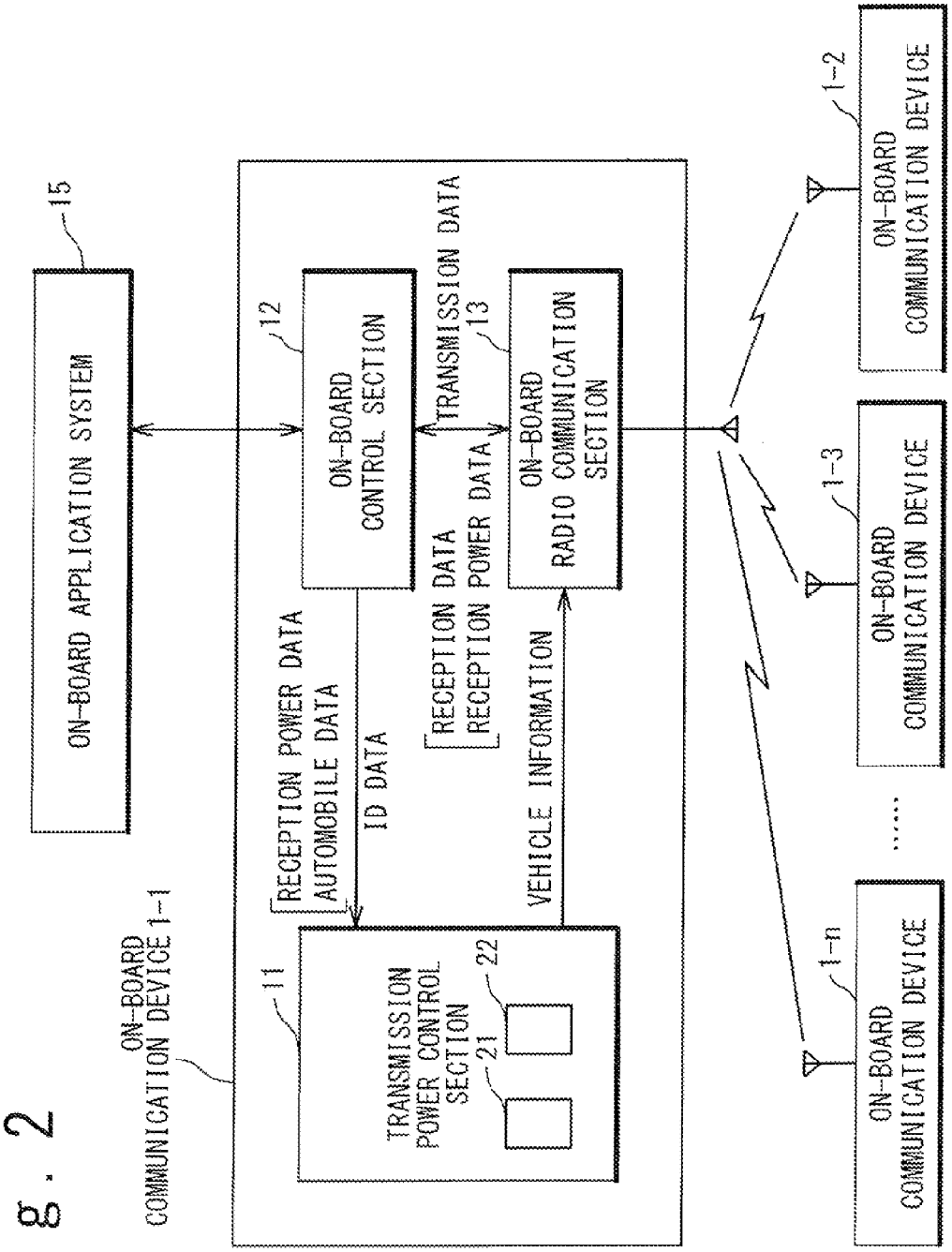
FIG. 2 is a block diagram showing a configuration of an exemplary embodiment of an on-board communication device as a radio communication apparatus of the present invention.

FIGS. 1 and 2 are block diagrams showing the configuration of the on-board communication device as the radio communication apparatus according to an exemplary embodiment of the present invention. The on-board communication device 1 contains a transmission power control section 11, an on-board radio section 12 and an on-board control section 13. Here, although the on-board communication device 1-1 will be described, the on-board communication devices 1-2, . . . of the peripheral automobiles have the configuration similar to that of the on-board communication device 1-1.

The on-board radio section 12 transmits and receives a radio signal to and from the on-board communication devices 1-2, . . . of the peripheral automobiles. That is, at the time of the reception, the on-board radio section 12 receives a radio reception signal from the different on-board communication device 1. The radio reception signal is converted into a reception data, and the reception data and a reception power data are outputted to the on-board control section 13. The reception power data indicates a value of reception power (a reception power measurement value) when the radio reception signal is received. On the other hand, at the time of the transmission, the on-board radio section 12 receives a transmission data from the on-board control section 13 and a vehicle information from the transmission power control section 11. The vehicle information contains a transmission power data indicating a value of transmission power (a transmission power setting value) when a radio transmission signal is transmitted, and an identifier (ID) data indicating this on-board communication device 1-1. The vehicle information may include a position data of the on-board communication device 1-1. The on-board radio section 12 converts the transmission data added with the vehicle information into the radio transmission signal, and transmits the radio transmission signal to the on-board communication devices 1-2, . . . of the peripheral automobiles in the transmission power specified by the transmission power setting value.

The on-board control section 13 controls a signal flow (a data flow) in the on-board communication device 1-1. Also, the on-board control section 13 inputs and outputs a data from and to an apparatus outside the on-board communication device 1-1, for example, an on-board application system 15. A GPS system or an on-board sensor is exemplified as the on-board application system 15. Moreover, the vehicle information received from the on-board communication devices 1-2, . . . of the peripheral automobiles are outputted to the transmission power control section 11.

For example, at the time of the reception, the on-board control section 13 receives the reception data and the reception power data from the on-board radio section 12 and outputs the reception data to the on-board application system 15 and the vehicle information and the reception power data in the reception data to the transmission power control section 11. In this case, the vehicle information contains the transmission power data (the transmission power setting value) when the counter on-board communication device 1-2 has transmitted the radio signal received by this on-board communication device 1-1; and the ID data indicating the counter on-board communication device 1-2. The vehicle information may contain the position data of the on-board communication devices 1-2, . . . of the peripheral automobiles.

On the other hand, at the time of the transmission, the on-board control section 13 receives the transmission data from the on-board application system 15 and outputs to the on-board radio section 12. Also, the on-board control section 13 outputs the ID data of the counter on-board communication device 1 of the transmission destination of the transmission data to the transmission power control section 11. The transmission data may contain the position data determined by a GPS system of the on-board communication device 1-1 that is incorporated in the vehicle information by the on-board radio section 12.

The transmission power control section 11 receives the vehicle information and the reception power data in the reception data from the on-board control section 13. As mentioned above, the vehicle information in the reception data contains the transmission power data (transmission power setting value) and the position data at the time of the transmission from the on-board communication device 1-2 of the peripheral automobile, and the ID data of the on-board communication device 1-2. The transmission power control section 11 relates the ID data of the vehicle information, the transmission power setting value, the reception power measurement value of the reception power data, and a reception time of the data, and stores as a data set in a peripheral automobile table 22. The peripheral automobile table 22 is stored in, for example, a semiconductor memory or HDD (Hard Disk Drive).

FIG. 4 is a diagram showing the peripheral automobile table. The ID data, the transmission power setting value, the reception power measurement value and the reception time are related to each other as the data set. When the data set to the same ID data is received, the reception time, the transmission power setting value and the reception power measurement value are updated in the peripheral automobile table 22. The position data may be contained. Also, each data set may be removed if the update is not carried out in a predetermined period.

The transmission power control section 11 further stores a transmission power setting table 21 in which the reception power measurement value and the transmission power setting value are related to each other. The transmission power setting table 21 is used to determine the transmission power setting value (c) in the on-board communication device 1-1 in accordance with the reception power measurement value (a) of the radio signal measured in the on-board communication device 1-1 when the radio transmission is next performed from the on-board communication device 1-1 to the on-board communication device 1-2; and the transmission power setting value (b) in the on-board communication device 1-2 transmitting the radio signal. The transmission power setting table 21 is stored in, for example, a semiconductor memory or HDD (Hard Disk Drive).

Figure 5:
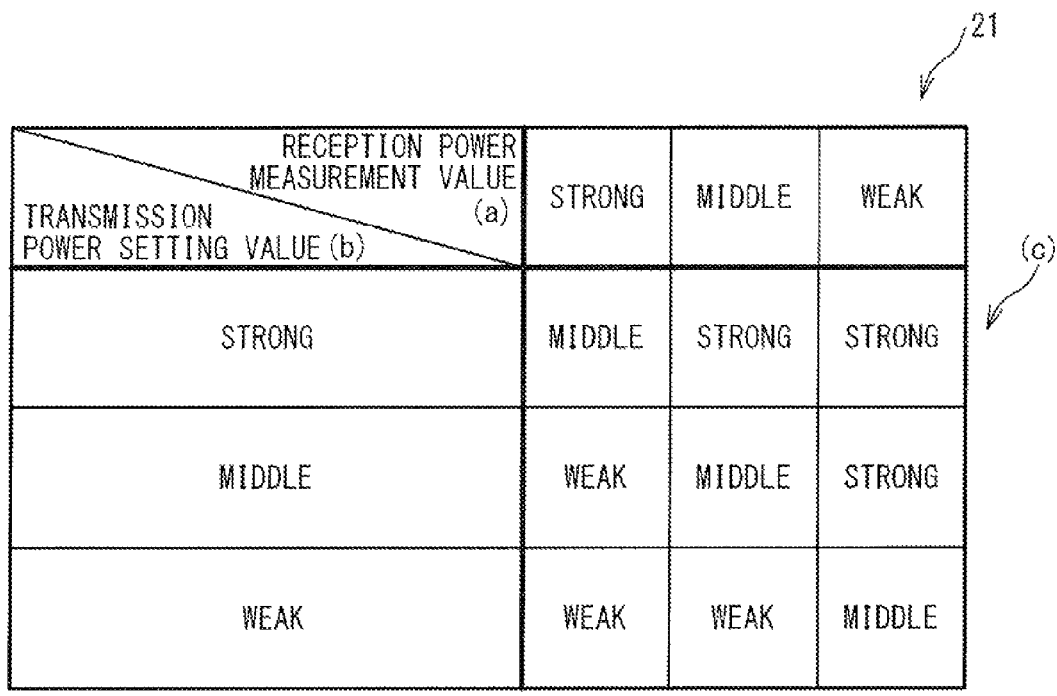
FIG. 5 is a table showing a transmission power setting table.

FIG. 5 is a diagram showing the transmission power setting table. However, in order to simplify the description, the transmission power setting table does not indicate specific values as one example. The categories of the intensity are set to the three of [Strong], [Middle] and [Weak]. That is, the reception power measurement value (a) and the transmission power setting value (b) are assumed to belong to any of the categories. For example, when the reception power measurement value (a) belongs to [Middle] and the transmission power setting value (b) belongs to [Strong], the transmission power setting value (c) in the on-board communication device 1-1 is determined to be [Strong]. It should be noted that [Strong], [Middle] and [Weak] specifically indicate the respective predetermined power ranges (1 to 5 W/5 to 10 W/10 to 15 W) or energy ranges. The method of producing the transmission power setting table 21 will be described later.

When transmitting the data to the automobile of the ID data received from the on-board control section 13, the transmission power control section 11 refers to the peripheral automobile table 22 and obtains the reception power measurement value and transmission power setting value, which correspond to the ID data. The transmission power setting value (c) is extracted which corresponds to the reception power measurement value (a) and the transmission power setting value (b). After that, the vehicle information, which contains the transmission power data to indicate the transmission power setting value and the ID data indicating the on-board communication device 1-1, is produced and outputted to the on-board radio section 12.

Here, the transmission power control section 11, the on-board radio section 12 (except for the transmission/reception) and the on-board control section 13 may be configured in hardware such as a circuit, or may be configured in software such as a program executed on a computer, or may be configured in the form of a combination of them.

Figure 3:
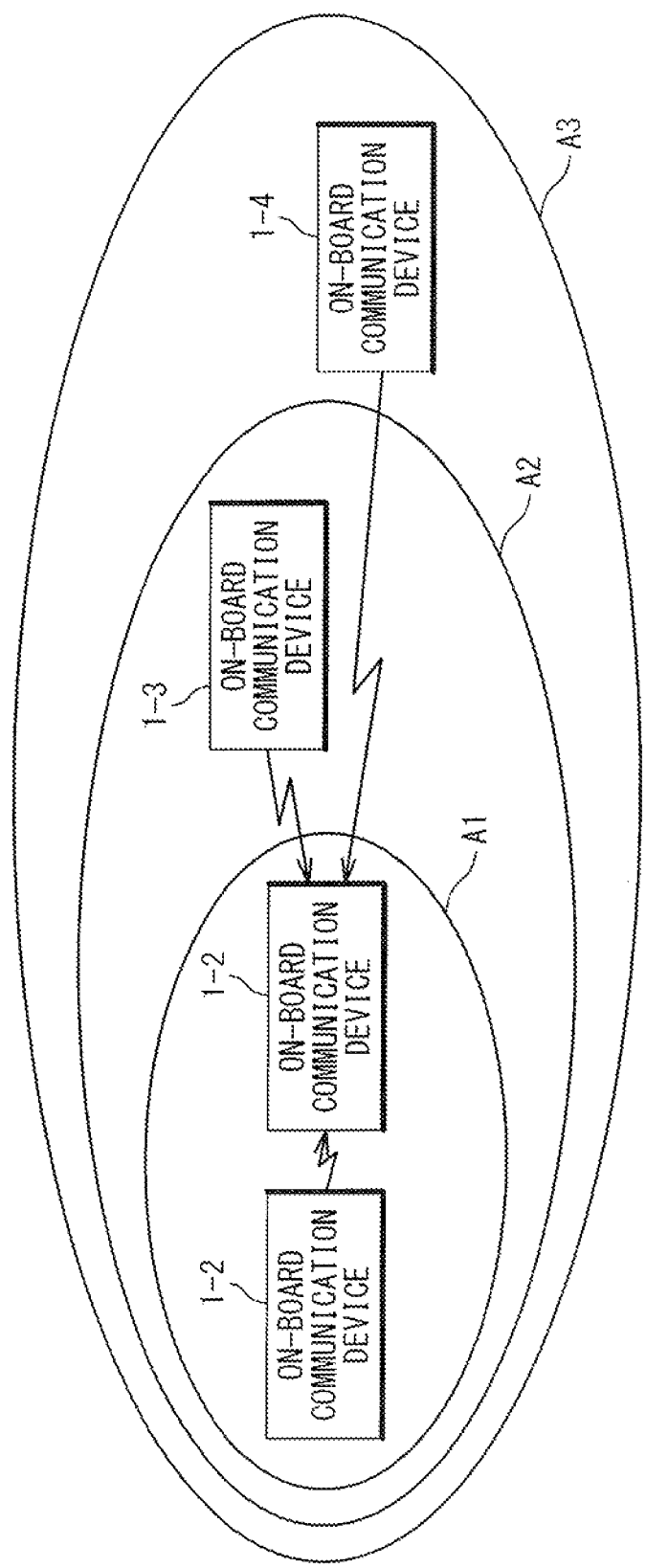
FIG. 3 is a schematic view showing one example of a situation that is assumed in an exemplary embodiment of a transmission power control method of the present invention.

Next, the transmission power control method (the operation of the on-board communication device) according to the exemplary embodiment of the present invention will be described below. FIG. 3 is a diagram showing one example of a state that is assumed in the transmission power control method according to the exemplary embodiment of the present invention. In the inter-automobile communication system, the on-board communication device 1-1 is assumed to receive the radio signals from the plurality of on-board communication devices 1, such as other on-board communication devices 1-2, 1-3 and 1-n. At this time, the reception power in the on-board communication device 1-1 depends on a setting value of transmission power of the on-board communication device, a distance from the on-board communication device and a state of a propagation path. When the radio signal is received from another on-board communication device, the state of the propagation path at the time of the reception and the state of the propagation path at the time of the transmission can be assumed to be approximately equal, if a time interval until the transmission of the radio signal to an opposite direction is short. For example, when the signal is received from the on-board communication device 1-2 located in an area A1, it can be assumed that the on-board communication device 1-2 is located inside substantially the same area A1 and the state of the propagation path is substantially the same, if the time interval until the transmission of the signal to the on-board communication device 1-2 is short. Similarly, when the signals are received from the on-board communication devices 1-3 and 1-4 located in areas A2 and A3, it can be assumed that the on-board communication devices 1-3 and 1-4 are located inside substantially the same areas A2 and A3 and the states of the propagation paths are substantially the same, if the temporal periods until the transmissions of the signals to the on-board communication devices 1-3 and 1-4 are short.

Here, it is supposed that a communication is performed between the on-board communication device 1-1 and the on-board communication device 1-2. When the transmission power setting value of the on-board communication device 1-2 is [Strong] and the reception power of the on-board communication device 1-1 at that time is [Weak], it can be expected that the reception power in the on-board communication device 1-2 becomes [Weak] even though the transmission power is set to [Strong], if the on-board communication device 1-1 carries out reply transmission to the on-board communication device 1-2. On the other hand, when the transmission power setting value of the on-board communication device 1-2 is [Strong] and the reception power of the on-board communication device 1-1 at that time is also [Strong], it can be expected that the reception power is [Middle] even if the transmission power when the on-board communication device 1-1 carries out the reply transmission to the on-board communication device 1-2 is set at [Middle]. Thus, if the reception is stably possible under the reception power of [Middle], the transmission power setting value at the time of the reply transmission can be decreased to [Middle] in the latter case. The transmission power setting value when the reply transmission is carried out can be set from the combination of the transmission power setting value in the on-board communication device and the reception power measurement value, in accordance with such idea. The transmission power setting table 21 shown in FIG. 5 is produced under such idea.

The transmission power setting table 21 shown in FIG. 5 can be applied in its original state when only the two on-board communication devices 1 exist in a communication territory and the one-to-one communication is carried out.

With reference to FIG. 3, in case that many on-board communication devices 1 exist in a communication territory and data exchange is performed with each other, it could be considered that [Strong] is required as the transmission power setting value for the communication with a part of the on-board communication devices (e.g., 1-4), and [Middle] is required as the transmission power setting value for the communication with another part of the on-board communication devices (e.g., 1-3), and [Weak] is sufficient as the transmission power setting value for the communication with still another part of the on-board communication devices (e.g., 1-2). In this case, when the transmission power setting value is set to [Middle], the communicable range can be limited to the area A2 including the area A1, and the number of the communicable on-board communication devices 1 can be limited. Moreover, when the transmission power setting value is set to [Weak], the communicable area can be limited to the area A1, and the number of the communicable on-board communication devices can be further limited. In this way, since the transmission power setting value is changed to limit the communicable area, it is possible to reduce the congestion and to eliminate the drop of throughput.

In this case, it is possible to carry out the transmission power control, taking the number of the communicable on-board communication devices into account, in addition to the combination of the transmission power setting value and the reception power measurement value. In the example of FIG. 3, the communicable area is the area A3 in case of [Strong], and the three on-board communication devices 1-2 to 1-4 are communicable. The communicable area is the area A2 in case of [Middle], and the two on-board communication devices 1-2 and 1-3 are communicable. The communicable area is the area A1 in case of [Weak], and one on-board communication device 1-2 is communicable.

Figure 6:
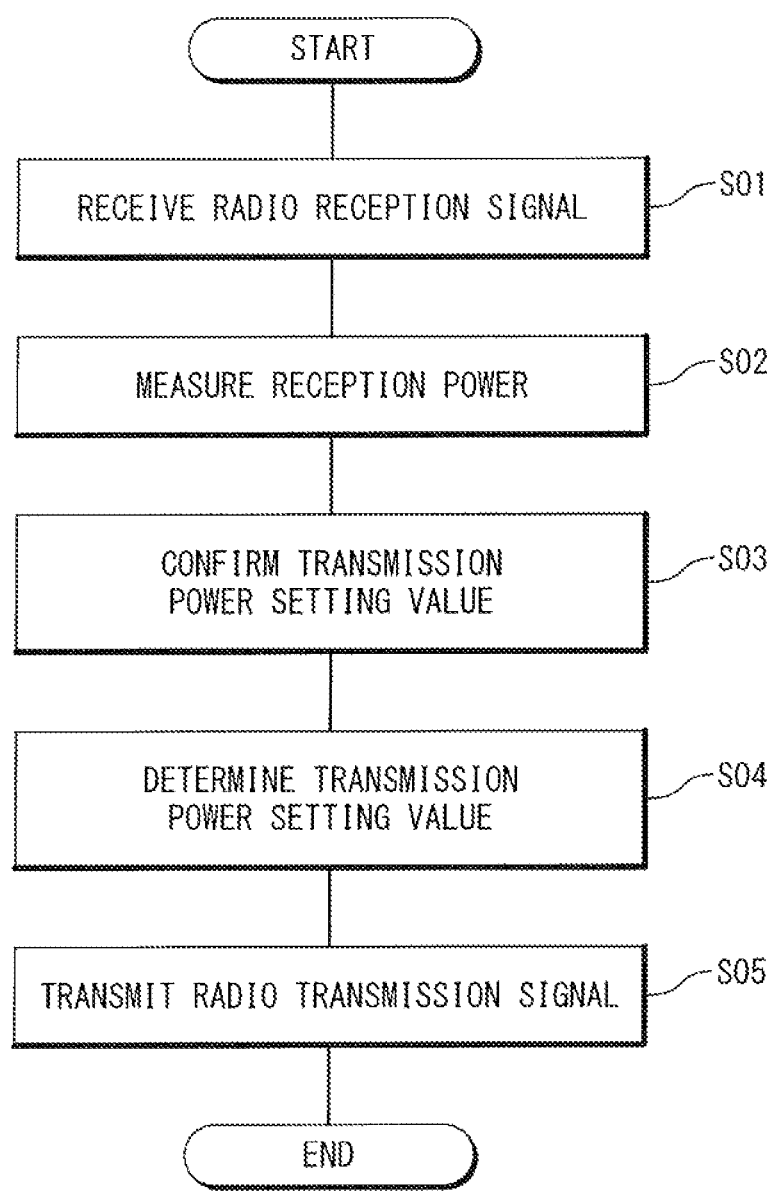
FIG. 6 is a flowchart showing the exemplary embodiment of the transmission power control method of the present invention.

Next, FIG. 6 is a flowchart showing the transmission power control method according to the exemplary embodiment of the present invention. The transmission power control method will be described in which the on-board communication device 1-1 communicates with the on-board communication device 1-2 in the peripheral communication apparatus.

The on-board radio section 12 receives the radio reception signal from the on-board communication device 1-2 (S01). Subsequently, the on-board radio section 12 measures the power of the radio reception signal and determines the reception power measurement value (S02). Subsequently, the on-board radio section 12 produces a reception power data indicating the reception power measurement value. Then, the on-board radio section 12 converts the radio reception signal into the reception data and outputs the reception data and the reception power data to the on-board control section 13.

The on-board control section 13 receives the reception data and the reception power data from the on-board radio section 12. Subsequently, the on-board control section 13 extracts the vehicle information from the reception data and outputs the reception data to the on-board application system 15. Then, the on-board control section 13 outputs the extracted vehicle information (including the transmission power setting value and the ID data) and the reception power data to the transmission power control section 11.

The transmission power control section 11 receives the vehicle information and the reception power data from the on-board control section 13. Subsequently, the transmission power control section 11 extracts the ID data and the transmission power setting value from the vehicle information (S03). Then, the transmission power control section 11 relates the ID data, the transmission power setting value, the reception power measurement value of the reception power data, and the reception time of the data, and stores them as the peripheral automobile table 22.

The on-board control section 13 receives the transmission data to the on-board communication device 1-2 from the on-board application system 15 and outputs to the on-board radio section 12. Simultaneously, on-board control section 13 outputs the ID data of the transmission destination (the on-board communication device 1-2) of the transmission data to the transmission power control section 11.

The transmission power control section 11 obtains the ID data indicating the on-board communication device 1-2 as the transmission destination of the transmission data from the on-board control section 13. Subsequently, the transmission power control section 11 refers to the peripheral automobile table 22 and obtains the transmission power setting value from the on-board communication device 1-2 and the reception power measurement value in the on-board communication device 1-1, which correspond to the ID data of the on-board communication device 1-2. Then, the transmission power control section 11 refers to the transmission power setting table 21 and determines the transmission power setting value of the on-board communication device 1-1, which corresponds to the transmission power setting value for the on-board communication device 1-2 and the reception power measurement value of the on-board communication device 1-1, when the transmission data will be next transmitted (S04). After that, the transmission power control section 11 produces the vehicle information, which includes the transmission power data indicating the transmission power setting value in the on-board communication device 1-1 and the ID data indicating the on-board communication device 1-1, and outputs to the on-board radio section 12.

The on-board radio section 12 receives the transmission data from the on-board control section 13 and receives the vehicle information from the transmission power control section 11. Then, the on-board radio section 12 converts the transmission data to which the vehicle information is added, into the radio transmission signal and transmits the radio transmission signal under the transmission power specified by the transmission power setting value (S05).

Figure 7:
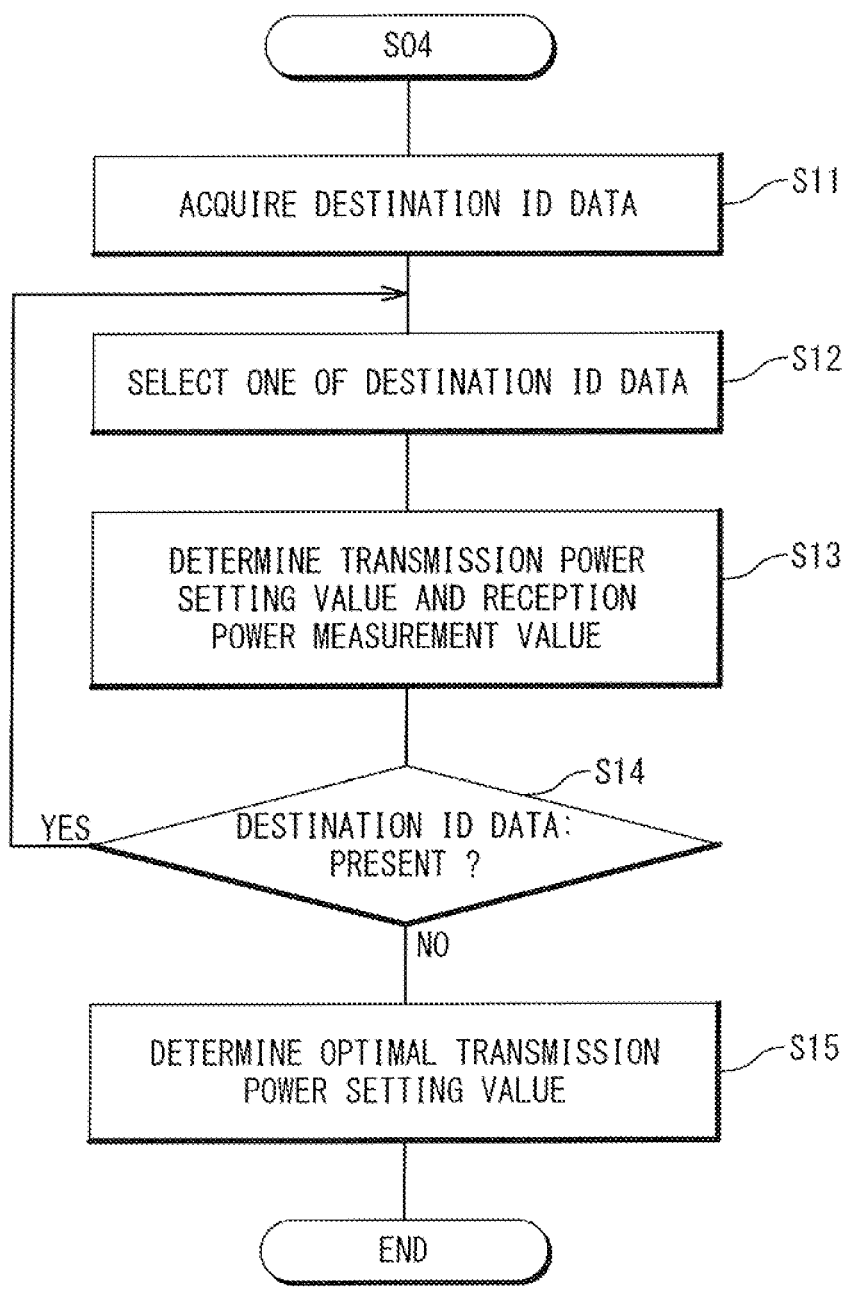
FIG. 7 is a flowchart showing a detail of S04.

Here, at the S04, in case of the communication in which the many on-board communication devices 1 exist in the communication area and exchange the data with each other, the method of determining the transmission power setting value will be described. FIG. 7 is a flowchart showing the detail of the step S04. Here, an example when the on-board communication device 1-1 communicates with the on-board communication devices 1-2 and 1-3 of the peripheral automobiles will be described.

The on-board control section 13 receives the transmission data to the plurality of on-board communication devices 1-2 and 1-3 from the on-board application system 15 and outputs to the on-board radio section 12. Simultaneously, the on-board control section 13 outputs the plurality of ID data of the on-board communication devices 1-2 and 1-3 as the transmission destination of the transmission data to the transmission power control section 11.

The transmission power control section 11 obtains the plurality of ID data of the on-board communication devices 1-2 and 1-3 as the transmission destination of the transmission data from the on-board control section 13 (S11). Subsequently, the transmission power control section 11 selects one ID data of the on-board communication device 1-2 from the plurality of ID data of the on-board communication devices 1-2 and 1-3) (S12). Then, the transmission power control section 11 refers to the peripheral automobile table 22 and obtains the transmission power setting value for the on-board communication device 1-2 and the reception power measurement value in the on-board communication device 1-1, which corresponds to the ID data of the on-board communication device 1-2. Then, the transmission power control section 11 refers to the transmission power setting table 21 and determines the transmission power setting value of the on-board communication device 1-1, which corresponds to the transmission power setting value of the on-board communication device 1-2 and the reception power measurement value by the on-board communication device 1-1, when the transmission data will be next transmitted (S13). The steps S12 and S13 are performed on all of the ID data (S14). As a result, the plurality of transmission power setting values are obtained for the plurality of ID data. After that, the transmission power control section 11 determines the highest transmission power setting value, from the plurality of transmission power setting values, as a final transmission power setting value (S15).

It should be noted that at the step S15, the highest transmission power setting value is selected from the plurality of transmission power setting values. However, the transmission power setting value may be determined in accordance with other rules. For example, there is the transmission power setting value whose number is greatest.

By using the transmission power control method (the operation of the on-board communication device) of the present invention as mentioned above, the on-board communication device of each automobile can autonomously control the transmission power, in accordance with the state of the propagation path from another on-board communication device 1. Thus, the excessive/lack state of the transmission power can be solved, thereby improving the stability and reliability of the communication. Together with it, since the transmission power is autonomously controlled on the basis of the distribution of the peripheral on-board communication devices 1, the communicable area can be adjusted, which can equivalently suppress the number of the communication apparatuses inside the communication area. As a result, it is possible to reserve the radio link with the peripheral communication apparatuses and to reduce the congestion and to eliminate the drop of throughput.

Figure 8:
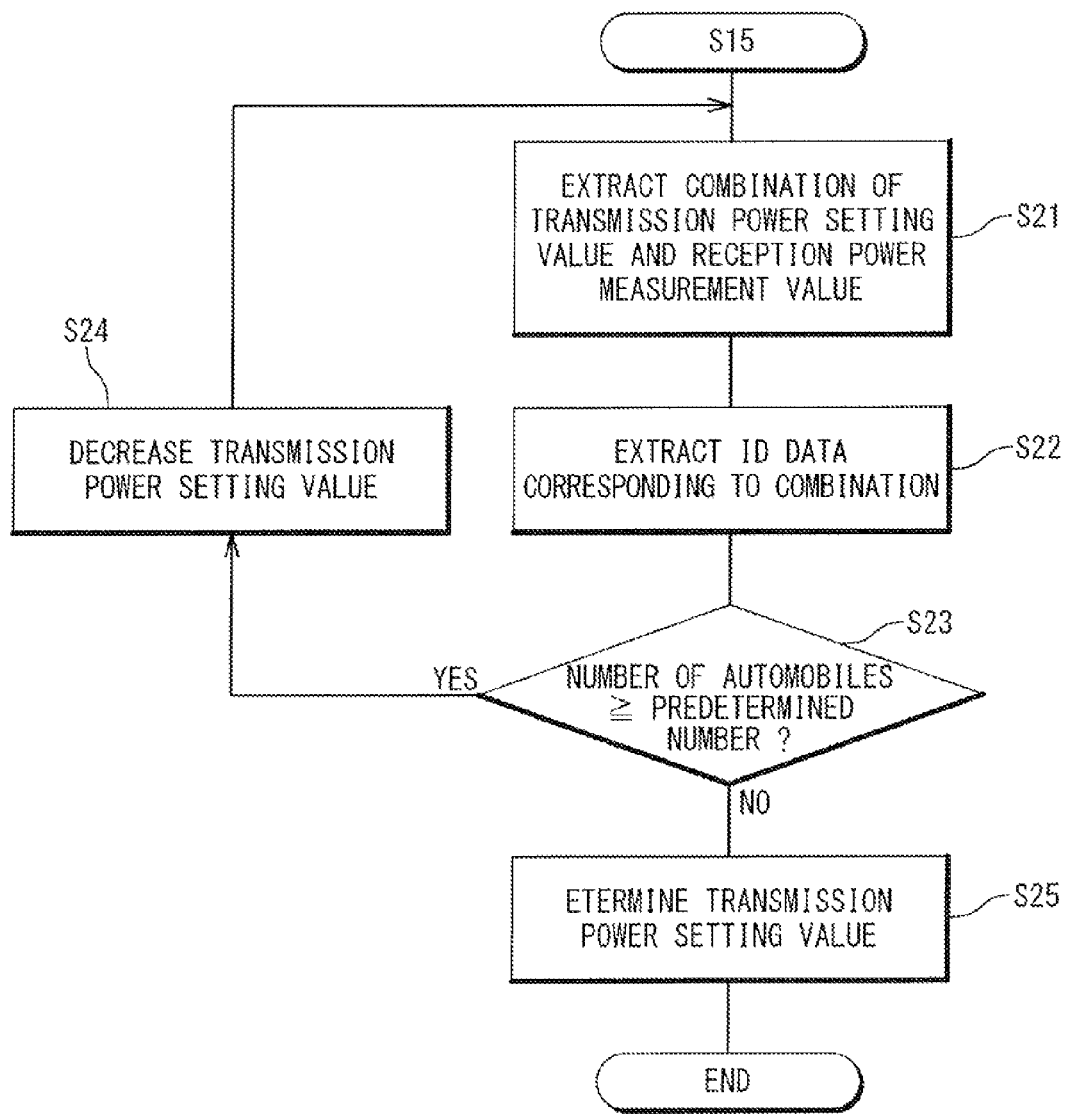
FIG. 8 is a flowchart showing a process for adding S15.

Moreover, the following process may be added to the step S15. In this case, the data of the number of the on-board communication devices 1 of the communicable automobiles can be considered to determine the transmission power setting value. FIG. 8 is a flowchart showing a process added to the step S15. That is, at first, a combination of the reception power measurement value (a) and the transmission power setting value (b) for a transmission power setting value (c) which is equal to or less than the transmission power setting value (c) determined at the steps S11 to S15 is extracted from the transmission power setting table 21 (FIG. 5) (S21). Subsequently, the ID data of the on-board communication device 1 having the combination (the transmission power setting value (b) and the reception power measurement value (a)) is extracted from the peripheral automobile table (S22). Then, the number of the ID data (=the number of the automobiles) is calculated. As a result, if the number of the automobiles is equal to or greater than a desirable number (S23: Yes), the transmission power setting value determined at the steps S11 to S15 is reduced by one stage (S24). Then, the process flow returns to the step S21, and the process is executed. If the number of the automobiles is equal to or less than the desirable number (S23: No), the transmission power setting value at that time is determined as the final transmission power setting value (S25).

In the above-mentioned exemplary embodiment, the case has been described in which the present invention is applied to the inter-automobile communication system. However, even in case that the communication between a road-side communication apparatus and the automobile and the communication between the automobiles are commonly used, it is similarly possible to apply the transmission power control method and radio communication apparatus of the present invention, by replacing a part of the plurality of on-board communication devices with road-side communication apparatus.

According to the present invention, in the radio communication system in which a direct communication is carried out between the automobile communication apparatuses without any intervention of a base station, in particular, if the communication apparatuses are dense, each automobile communication apparatus autonomously controls the transmission power on the basis of the distribution of the peripheral communication apparatuses, and consequently adjusts the communicable area and equivalently suppresses the number of the communication apparatuses inside the communication area. Thus, the automobile communication apparatus can consequently reserve the radio link with the peripheral communication apparatuses and further reduce the congestion and eliminate the drop of throughput.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

What is claimed is:

1. A radio communication apparatus which performs a direct communication with a counter radio communication apparatus, said radio communication apparatus comprising:
 a radio section configured to receive from the counter radio communication apparatus, a first radio signal which contains a first transmission power setting value as a setting value of power at transmission from the counter radio communication apparatus, and to measure a first reception power value as a power value at reception of said first radio signal, wherein the first transmission power setting value comprises a first value of a plurality of predetermined values, and the first reception power value comprises a second value of the plurality of predetermined values; and a transmission power control section configured to determine a second transmission power setting value as a setting value of power at transmission of a second radio signal to the counter radio communication apparatus based on a predetermined relationship between the first value and the second value, wherein said radio section transmits said second radio signal, which contains said second transmission power setting value, to the counter radio communication apparatus in transmission power indicated with said second transmission power setting value.

2. The radio communication apparatus according to claim 1, wherein there are a plurality of said counter radio communication apparatuses, said radio section receives said first radio signal which contains said first transmission power setting value from each of said plurality of counter radio communication apparatuses, and measures said first reception power value from said each counter radio communication apparatus, said transmission power control section determines said second transmission power setting value for said each counter radio communication apparatus based on said first transmission power setting value and said first reception power value, and determines one of a plurality of said second transmission power setting values which meets a predetermined condition as a second final transmission power setting value, and said radio section transmits to said plurality of counter radio communication apparatuses, said second radio signal which contains said second final transmission power setting value in transmission power with said second final transmission power setting value.

3. The radio communication apparatus according to claim 1, wherein said counter radio communication apparatus is a road-side radio communication apparatus.

4. A transmission power control method in a radio communication apparatus which performs a direct communication with a counter radio communication apparatus, said transmission power control method comprising:

measuring a first reception power value as a power value at reception of a first radio signal, when said first radio signal which contains a first transmission power setting value as a setting value of power at transmission from said counter radio communication apparatus is received from said counter radio communication apparatus, wherein the first transmission power setting value comprises a first value of a plurality of predetermined values, and the first reception power value comprises a second value of the plurality of predetermined values;

determining a second transmission power setting value as a setting value of power at transmission of a second radio signal to said counter radio communication apparatus based on a predetermined relationship between the first value and the second value; and transmitting said second radio signal, which contains said second transmission power setting value, to said counter radio communication apparatus in a transmission power indicated with said second transmission power setting value.

5. The transmission power control method according to claim 4, wherein there are a plurality of said counter radio communication apparatuses, said measuring comprises:
measuring a first reception power value as a power value at reception of a first radio signal, when said first radio signal which contains a first transmission power setting value as a setting value of power at transmission from said counter radio communication apparatus is received from each of said plurality of counter radio communication apparatuses, said determining comprises:
determining said second transmission power setting value for said each counter radio communication apparatus based on said first transmission power setting value and said first reception power;
determining one of a plurality of said second transmission power setting values which meets a predetermined condition as a second final transmission power setting value, and said transmitting comprises:
transmitting to said plurality of counter radio communication apparatuses, said second radio Signal which contains said second final transmission power setting value, in transmission power with said second final transmission power setting value.

6. A non-transitory computer-readable software storage medium in which computer-readable codes of a program are written to realize a transmission power control method in a radio communication apparatus which performs a direct communication with a counter radio communication apparatus, said transmission power control method comprising:

measuring a first reception power value as a power value at reception of a first radio signal, when said first radio signal which contains a first transmission power setting value as a setting value of power at transmission from said counter radio communication apparatus is received from said counter radio communication apparatus, wherein the first transmission power setting value comprises a first value of a plurality of predetermined values, and the first reception power value comprises a second value of the plurality of predetermined values;

determining a second transmission power setting value as a setting value of power at transmission of a second radio signal to said counter radio communication apparatus based on a predetermined relationship between the first value and the second value; and transmitting said second radio signal, which contains said second transmission power setting value, to said counter radio communication apparatus in a transmission power indicated with said second transmission power setting value.

* * * * *